United States Patent [19]
Haase

[11] 3,760,982
[45] Sept. 25, 1973

[54] PRESSURE WASH CONTROL SYSTEM

[75] Inventor: Robert L. Haase, Quakertown, Pa.

[73] Assignee: Aero Wash Systems, Inc., Quakertown, Pa.

[22] Filed: Feb. 24, 1971

[21] Appl. No.: 118,464

Related U.S. Application Data

[63] Continuation-in-part of Ser. No. 91,134, Nov. 19, 1970.

[52] U.S. Cl................ 222/63, 222/144.5, 222/318, 239/126
[51] Int. Cl............................................. B05b 9/00
[58] Field of Search................... 222/63, 136, 144.5, 222/193, 318; 239/126, 127, 304, 305

[56] References Cited
UNITED STATES PATENTS

| | | | |
|---|---|---|---|
| 3,491,948 | 1/1970 | Alexander...................... | 239/304 X |
| 3,369,755 | 2/1968 | Roden et al. .................. | 239/305 X |
| 3,383,044 | 5/1968 | Norstrud et al................. | 239/305 X |

Primary Examiner—Robert B. Reeves
Assistant Examiner—Frederick R. Handren
Attorney—Fleit, Gipple & Jacobson

[57] ABSTRACT

A pressure washer comprising a power driven pump having a fluid receiving inlet connected to a fluid directing means and a fluid discharge outlet connected to a fluid discharge means. The fluid directing means comprises a conduit means, a flow switch mounted to the conduit means, check valve means mounted to the conduit means, a regulator mounted to the conduit means, and injector means mounted to the conduit means. A circuit means connects the flow switch and injector means to operate the injector means in response to activation by the flow switch. The fluid discharge means comprises a second conduit means, a bypass fixture mounted to the second conduit means, the fixture having a bypass conduit secured thereto with the other end of the bypass conduit being secured to the first conduit means. The bypass construction allows fluid to flow from the second conduit means into the first conduit means for recirculation when the fluid is at a predetermined pressure. The check valve means is additionally mounted to the second conduit means to provide for a fluid flow from the first conduit means to the second conduit means when the pump is stopped. A spray gun is removably connected to the second conduit means to provide for the dispensing of fluid from the pump.

11 Claims, 2 Drawing Figures

PATENTED SEP 25 1973

3,760,982

INVENTOR
ROBERT L. HAASE
BY Fleit, Gipple & Jacobson
ATTORNEYS

PRESSURE WASH CONTROL SYSTEM

This application is a continuation-in-part of application Ser. No. 91,134, filed Nov. 19, 1970.

The invention relates to a high velocity washing apparatus which is adapted to deliver a liquid against the surface to be cleaned. The apparatus has a simplified control which is adapted to stop and start the pump which controls the flow of liquid through the apparatus and at the same time also controls the flow of one or more additional selected chemicals into the flow of liquid. A mechanical control is used with the invention to provide for the selection of the chemicals which are used in connection with the primarily liquid flow. When the fluid discharge or output of the system is blocked or cut off, pressure is built up in the system and accordingly when the output is released or allowed to be discharged, there is a drop in back pressure within the system. The present invention utilizes this pressure differential to control the system.

The invention is adapted for the control of high velocity washers having a power driven pump, the outlet of which is connected to a flexible conduit having a spray head, the inlet of which has means for supplying liquid to it including a flow switch, a pressure regulator and means to supply at least a secondary chemical to the primary liquid flow. An example of a known pressure washer is described in the Techler U.S. Pat. No. 3,246,845, granted Apr. 19, 1966.

The present invention provides a simple, efficient control for high pressure washing equipment utilizing fluid action to operate the apparatus.

Other features and advantages of the invention will be apparent from the following description of the embodiments of the invention as shown in the accompanying drawings.

DETAILED DESCRIPTION OF THE DRAWINGS

Figure 1:
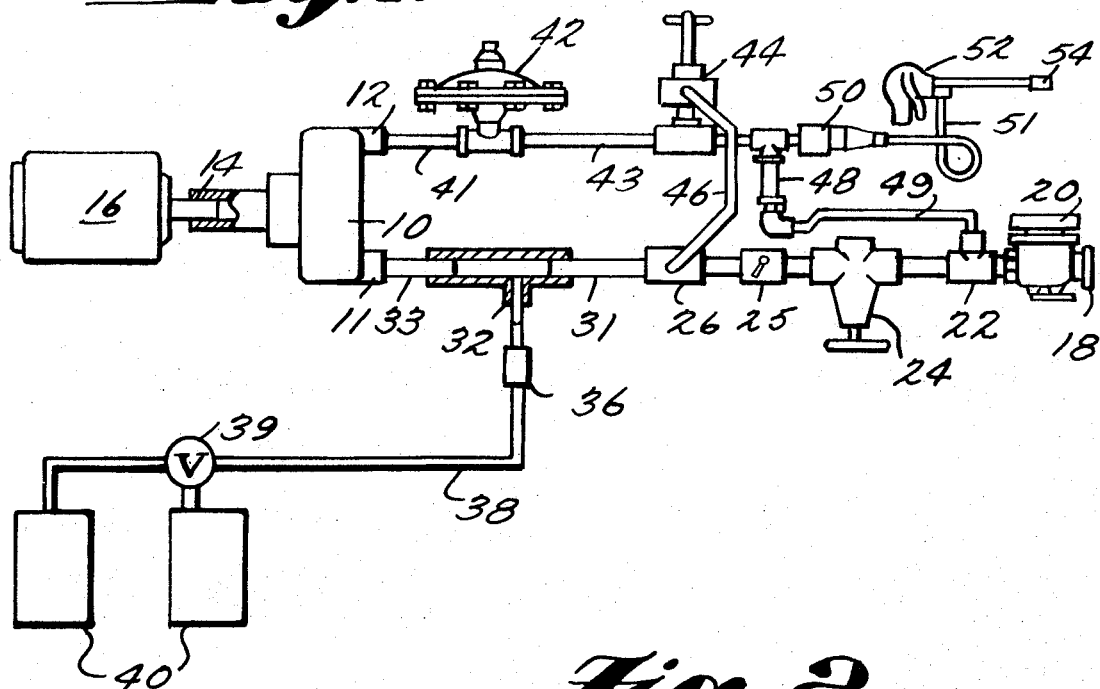
FIG. 1 is a schematic illustration of the flow system of the invention showing various elements of the system.
Figure 2:
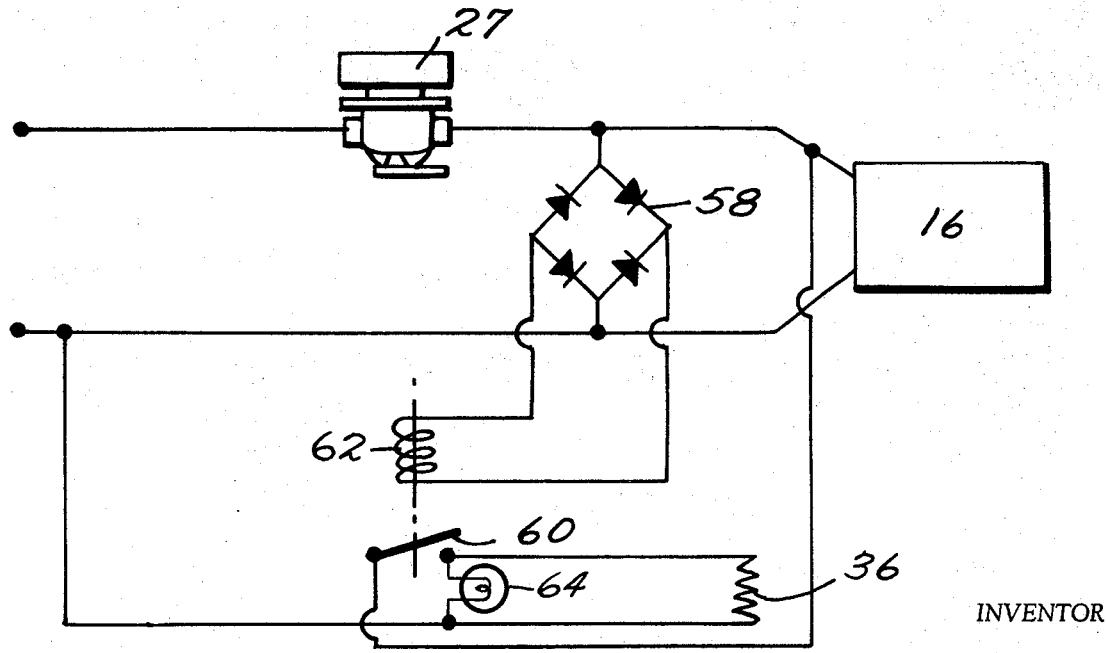
FIG. 2 is a schematic wiring diagram showing the control circuit of the system.

As shown in FIGS. 1 and 2, a pump 10 driven by a drive shaft 14, operated by motor 16, is adapted to be supplied with liquids by conduit means. The motor is connected to a source of power which is not shown. A typical pump that can be used with the invention is a 500 psi pump manufactured by Deloven, Model No. 20000A. However, any positive displacement pump can be used with the invention at any gallonage or at any pressure. A water inlet connection 18 connected to the conduit means is adapted to be connected to a source of water or any other liquid port. Ordinary tap water may be supplied to the inlet connection 18 by placing a standard garden hose connection on the inlet connection. It should be noted that the water inlet preferably is connected to a low pressure source of fluid. The fluid which is normally used in the invention is water and the term "water" is used throughout the specification interchangeably with the term "fluid." The term "water" should not be construed as to be limiting the invention only to that fluid, as degreaser or other suitable fluids can be used. Water coming in through inlet 18 passes through a flow switch 20 which is used to control the pump motor 16 by switch means when the flow through the switch drops below or rises above a predetermined value. The water continues its flow from the flow switch through a "T" in line fitting 22 and a pressure regulator 24 which regulates the pressure of water passing through it. The pressure regulator 24 which is of a standard make is preferably set to allow water under a pressure of 20 psi to pass therethrough. After the fluid has passed through the regulator at the set pressure, it is carried by a conduit to a return fitting 26. It should be noted that a one-way valve 25 is preferably placed in or mounted to the conduit between the pressure regulator 24 and return fitting 26 to keep any high pressure flow from coming back into the regulator and damaging the pressure regulator diaphragm. When the one-way check valve is closed by high pressure the fluid flow through flow switch 20 is stopped. A conduit 31 is connected to return fitting 26 and leads from the fitting to a chemical injector 32. The chemical injector 32 can be of a venturi or aspirator type construction so that the primary fluid passing through it will deliver a secondary chemical or plurality of chemicals into the pump along with the water via conduit 33 in cooperation with the vacuum created by the pump. The injector 32 is connected to a plurality of chemical tanks 40 by a conduit 38. An electrical solenoid valve 36, controlled by the flow switch 20 and circuit means is disposed in the conduit 38 to control the flow of fluid through conduit 38 into the injector 32. Depending upon the activation by the flow switch 20, the solenoid valve 36 is either open or closed. A mechanical four-way or three-way valve 39 serves to select the type of chemical being mixing with the water from tanks 40 depending upon which way the mechanical valve is set. By using the three-way valve or four-way valve, you can select one, two or three different chemicals to be added to the water in the system. In the mechanical valve 39, one position is preferably a deadhead, and will pick up no chemicals whatsoever, irregardless of whether the solenoid 36 opens or closes. The water or degreaser with additive chemical travels into the inlet 11 of pump 10 where it is built up to 500 psi and is discharged through the outlet 12 by way of conduit 41 into a surge guard pulsation reducer 42 so that the flow will be constant.

The pulsation reducer 42, as the name indicates, dampens or suppresses the pulsation of the flow discharged from the pump, enabling a constant flow through the high pressure side of the system. The constant flow of the fluid travels through conduit 43 into and through a pressure relief valve means 44, which is connected to a bypass conduit 46, the bypass conduit 46 having its other end connected to return fitting 26 allowing the fluid to recirculate back to the low level side when there is a pressure backup. The pressure relief valve means 44 is preferably adjustable between 110–700 pounds and if desired, can be used in connection with an unloader valve. In another embodiment of the invention, a pressure bypass valve is substituted for the pressure relief valve means 44. The bypass 46 returns excessive pressure fluid into the system for recirculation when the high pressure outlet is shut off. In normal operation the fluid continues its flow from valve means 44 through a relief check valve fitting 48 to a high pressure quick disconnect coupling 50 or other suitable connection, which is adapted to be fitted to a hose 51, one end of which has a mating coupling which will fit over the quick disconnect coupling 50, the other end of which is connected to a spray gun 52, which preferably has a variable spray nozzle 54. When the spray gun 52 is shut off, the pressure backs up in the system and increases to the point where it could possibly damage the pump which is the reason the bypass conduit 46 is provided. When the spray gun is shut off, the pressure causes the fluid to open the relief valve so that the fluid is recirculated through the bypass conduit 46 forcing one-way valve 25 to shut and block the flow through flow switch 20 activating the switch. The time from when the spray gun 52 is shut off until flow switch 20 cuts off the motor 16 is a short time in the range of one to several seconds.

A circuit of the system when the apparatus is working at the preferred pressure per square inch is shown in FIG. 2. When pressure is released by operation of spray gun 52 and fluid flows through the system, the flow switch which is designated 27 in FIG. 2 closes and when the outlet flow is shut off causing a backup of pressure, the flow switch opens up cutting off the pump motor 16. When the spray gun 52 is shut off you have a fluid flow stoppage or significant slowdown back at flow switch 20. With the gun in the open position, flow continues through the system allowing the flow switch 20 to be activated, closing the circuit and allowing electrical current to go through the motor and start the pump. When the pump is in operation, flow is substantially constant through the system. At the particular moment the pump goes off, there is a back pressure feed which will build up to approximately 25 psi, thus stopping fluid flow in the system. That back feed can vary according to length of hose and diameter of hose, and can vary as high as up to 50 pounds. Once the fluid flow rate is changed, the relief check valve fitting 48 allows the inlet water to flow through fitting 22 into conduit 49 and the high pressure side. When the pump is running the high pressure fluid is stopped by fitting 48 from passing back from the high pressure side into conduit 49. The flow switch 27 in relation to the circuit is preferably open so that when water enters the system at a specified pressure or flow the switch is closed completing the circuit to the full wave rectifier bridge 58. The rectifier bridge closes switch 60 by energizing or de-energizing mechanical latching solenoid 62 depending on how switch 60 is set up. The system preferably uses 110 volt alternating current and converts it into direct current. This is accomplished by using a rectifier bridge which converts the AC to DC.

A light or acoustical signal 64 is connected to the circuitry so that the signal will show the solenoid is energized. At the same time the pump is operating, solenoid valve 36 is energized, opening the conduit 38 leading to the chemical tanks 40 so that chemicals or a chemical are supplied to the injector 32. Chemicals will then be aspirated into the injector 32 depending on the mechanical setting of valve 39. If the valve is set on the deadhead, only water, degreaser or the fluid passing through inlet 18 will be passed through the system. If the valve is directed to open towards any of the respective chemical tanks 40, that chemical or chemicals will pass into the system through injector 32. Only in alternative cycles will the solenoid 36 be energized. In operation of the system the switching is envisioned as working off either the high pressure side or the low pressure side of the system. If desired the signal light could be placed on a pole or extension so that it would be visible over a greater distance.

The primary function of the above-mentioned apparatus is to enable an operator to selectively determine the type of fluid which is to be discharged upon the washing surface at a remote distance from the pump solely by the utilization of fluid flow within the system. This function utilizes the alternative activation of the solenoid 36 by the previously mentioned continuous duty mechanical latching relay 60 in that the solenoid of the apparatus is on an "on" or "off" position. After discharging the water through the nozzle, the operator can stop the fluid flow by shutting off the gun 52. Upon activation of the fluid flow, the solenoid assumes an alternate position from the initial position which it previously occupied. Assuming that it was originally in an open position, it allows an additional chemical to be placed into the water stream. When it is shut off and again activated, the solenoid assumes the alternate position which in this case would be the "off" position.

Thus, by starting and stopping the fluid discharge, the selection of chemicals or of a chemical to be placed on the washing surface can be achieved at a remote distance from the pump apparatus. The pump is permanently shut off by closing the gun nozzle and activated again by opening the gun nozzle.

While the preferred embodiment of the invention has been disclosed, it is understood that the invention is not limited to such an embodiment since it may be otherwise embodied in the scope of the appended claims.

What is claimed is:

1. A pressure washing system comprising a power driven pump having a fluid receiving inlet connected to a fluid directing means and a fluid discharge outlet connected to a fluid discharge means; means are provided to interconnect said fluid directing means with said fluid discharge means to allow fluid to pass therebetween in response to changes in fluid pressure; injector means is mounted to said fluid directing means; said injector means including valve means adapted to alternately assume closed and opened position to provide a flow of at least one chemical from reservoir means into said fluid directing means when said valve means is open, control means mounted to said fluid directing means; said control means comprising a flow switch, positioned to serve fluid flow through said fluid directing means and electrical circuit means; said control means stopping said pump when the flow of fluid through said flow switch is substantially stopped and activating said pump and actuating said valve means to one of its alternate positions when fluid passes through said flow switch.

2. A pressure washing system as claimed in claim 1, wherein said interconnection means includes a pressure bypass valve means connected to said fluid discharge means and said fluid directing means; said pressure bypass valve means being adapted to allow fluid to flow only from said fluid discharge means to said fluid directing means when a predetermined increase in pressure occurs in the fluid discharge means and flow switch relief means, said flow switch relief means comprising conduit means connected to said fluid discharge means and said fluid directing means, said conduit means including a relief check valve means.

3. A pressure washer comprising a power driven pump having a fluid receiving inlet and a fluid discharge outlet, a fluid directing means connected to said pump inlet, said fluid directing means comprising conduit means, a flow switch mounted to said conduit means, circuit means connected to said flow switch, a regulator mounted to said conduit means, said regulator serving to regulate fluid pressure passing through said conduit means and injector means mounted to said conduit means, said injector means being adapted to be operated by said flow switch and said circuit means to selectively add a fluid to said fluid directing means, a fluid discharge means connected to said pump outlet, said fluid discharge means comprising a second conduit means, bypass conduit means mounted to said second conduit means, said bypass conduit means also being connected to said first conduit means, said bypass conduit means being adapted to allow a fluid from said second conduit means to flow into said first conduit means when said fluid is at a predetermined pressure, check valve means mounted to said second conduit means, said check valve means being connected to said first conduit means and adapted to provide for a fluid flow from said first conduit means to said second conduit means when the pump is stopped, and a fluid dispensing means connected to said second conduit means.

4. A pressure washer as claimed in claim 3, wherein said flow switch and circuit means is adapted to run and stop said pump and selectively control the chemical flow from said injector means.

5. A pressure washer as claimed in claim 3 wherein said injector means includes reservoir means and a mechanical valve, said mechanical valve being adapted to selectively control fluid flow from said reservoir means.

6. A pressure washer as claimed in claim 3 wherein said first conduit means has a one-way check valve mounted thereto on the pump side of the regulator, said one-way check valve allowing fluid to pass from said regulator through it while preventing fluid from flowing through it toward said regulator.

7. A pressure washer as claimed in claim 3, wherein said second conduit means has a suppressor mounted thereto between said pump outlet and said bypass conduit means.

8. A pressure washer as claimed in claim 3, wherein said injector means comprises injector apparatus, a fluid additive conduit connected to said injector apparatus, solenoid valve means mounted to said fluid additive conduit, mechanical valve means mounted to said fluid additive conduit and at least one tank connected to said fluid additive conduit.

9. A pressure washer comprising a power driven pump having an inlet means and an outlet means, a first conduit means adapted to connect said inlet means to a source of fluid, control means mounted to said first conduit means, said control means comprising a flow switch and circuit means connected to said flow switch, a regulator secured to said first conduit means to regulate the pressure of fluid passing therethrough, injector means mounted to said first conduit means, said injector means comprising an aspirator apparatus a fluid supply conduit connected to said aspirator apparatus, a reservoir connected to said fluid supply conduit, solenoid valve means mounted in said supply conduit; said solenoid valve means being adapted to be opened and closed by said control means to allow fluid to flow from said reservoir into said aspirator apparatus, a second conduit means secured to said pump outlet; a pulsation reducer mounted to said second conduit means to control the flow of fluid discharged from said pump outlet, bypass valve means mounted to said second conduit means, said bypass valve means being connected to said first conduit means, to carry fluid from said second conduit means to said first conduit means upon a predetermined fluid pressure increase at said bypass valve, check valve means interconnecting said first conduit means and said second conduit means, said check valve means being adapted to allow flow of fluid only from said first conduit means to said second conduit means, and fluid dispensing means secured to said second conduit means.

10. A pressure washer as claimed in claim 9, wherein a one-way check valve is positioned in said first conduit means on the pump inlet side of said regulator and a relief check valve is mounted to said second conduit means.

11. A pressure washer as claimed in claim 9, wherein a mechanical valve is mounted to said fluid supply conduit to selectively allow different chemicals to pass into said fluid supply conduit from a plurality of chemical reservoirs.

* * * * *